(12) United States Patent  
Huebner et al.

(10) Patent No.: US 11,457,484 B2  
(45) Date of Patent: Sep. 27, 2022

(54) METHOD FOR ESTABLISHING A WIRELESS DATA LINK

(71) Applicant: WABCO GmbH, Hannover (DE)

(72) Inventors: Soeren Huebner, Varel (DE); Thomas Wolf, Barsinghausen (DE); Sebastian Kuehne, Sarstedt (DE); Philip Meyer-Roessler, Hildesheim (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 348 days.

(21) Appl. No.: 16/486,843

(22) PCT Filed: Mar. 12, 2018

(86) PCT No.: PCT/EP2018/056009  
§ 371 (c)(1),  
(2) Date: Aug. 19, 2019

(87) PCT Pub. No.: WO2018/166940  
PCT Pub. Date: Sep. 20, 2018

(65) Prior Publication Data  
US 2020/0236722 A1  Jul. 23, 2020

(30) Foreign Application Priority Data

Mar. 17, 2017 (DE) .......................... 102017002633.5

(51) Int. Cl.  
*H04W 4/46* (2018.01)  
*H04W 76/10* (2018.01)  
*H04L 12/40* (2006.01)

(52) U.S. Cl.  
CPC ............. *H04W 76/10* (2018.02); *H04W 4/46* (2018.02); *H04L 2012/40215* (2013.01)

(58) Field of Classification Search  
CPC ..... H04L 12/40189; H04L 2012/40215; H04L 2012/40267; H04L 41/08; H04W 4/46; H04W 76/10; H04W 84/12  
See application file for complete search history.

(56) References Cited

U.S. PATENT DOCUMENTS 10,160,427 B2  12/2018  Risse et al.  
2002/0030590 A1  3/2002  Dieckmann et al.  
(Continued)

FOREIGN PATENT DOCUMENTS

CN  102169624 A  8/2011  
CN  106103222 A  11/2016  
(Continued)

OTHER PUBLICATIONS

European Transport Board ("Road vehicles—Interchange of digital information on electrical connections between braking and auxiliary data collection systems on towed vehicles"; Version 1.1; 2014) (Year: 2014).*

(Continued)

*Primary Examiner* — Melvin C Marcelo  
*Assistant Examiner* — Natali Pascual Peguero  
(74) *Attorney, Agent, or Firm* — Leydig, Voit & Mayer, Ltd.

(57) ABSTRACT

A method for establishing a wireless data link between at least two vehicles which are connected to one another via a physical data link includes transmitting link parameters of the wireless link via the physical data link connecting the at least two vehicles and establishing the wireless link using the link parameters transmitted via the physical data link connecting the at least two vehicles.

9 Claims, 4 Drawing Sheets

(56) References Cited

U.S. PATENT DOCUMENTS

| | | | |
|---|---|---|---|
| 2008/0303648 A1* | 12/2008 | Day | B60D 1/62 340/431 |
| 2013/0142068 A1* | 6/2013 | Marinier | H04W 48/10 370/252 |
| 2017/0245321 A1 | 8/2017 | Dieckmann et al. | |

FOREIGN PATENT DOCUMENTS

| | | |
|---|---|---|
| DE | 102013217684 A1 | 3/2015 |
| DE | 102014015394 A1 | 4/2016 |

OTHER PUBLICATIONS

2014 IEEE International Conference on Vehicular Electronics and Safety (ICVES) ("Study of ISO 14229-1 and ISO 15765-3 and Implementation in EMS ECU for EEPROM for UDS Application"; Dec. 16-17, 2014. Hyderabad, India) (Year: 2014).*

* cited by examiner

METHOD FOR ESTABLISHING A WIRELESS DATA LINK

CROSS-REFERENCE TO PRIOR APPLICATIONS

This application is a U.S. National Phase Application under 35 U.S.C. § 371 of International Application No. PCT/EP2018/056009, filed on Mar. 12, 2018, and claims benefit to German Patent Application No. DE 10 2017 002 633.5, filed on Mar. 17, 2017. The International Application was published in German on Sep. 20, 2018 as WO 2018/166940 under PCT Article 21(2).

FIELD

The invention relates to a method for establishing a wireless data link between at least two vehicles which are connected to one another via a physical data link. The invention also relates to a control unit and to a vehicle network.

BACKGROUND

Modern commercial vehicles, in particular towing vehicles, have a plurality of control units, for example an engine control unit, a transmission control unit and a brake control unit, which can communicate with one another via a Controller Area Network (CAN) bus. A control unit for wireless communication can also be connected to the CAN bus, either for the purpose of wirelessly transmitting information available to the control units or even wirelessly transferring control commands to selected control units.

Control units are likewise present in modern trailers, at least a brake control unit for an electronic brake system which is assigned to a pneumatic brake installation. The electronic brake system of the trailer is connected to the electronic brake system (and the CAN bus) of the towing vehicle via a physical data link according to International Organization for Standardization (ISO) 11992. Further subsystems and additional functions, for instance air suspension, rear area monitoring etc., can be linked to the electronic brake system in the trailer. Furthermore, a communication unit can be connected to the brake control unit as a further control unit. The communication unit is used for wireless communication with the towing vehicle and/or an operator, see DE 10 2014 015 394 A1. Reference is made to this document in full.

Receivers and transmitters of wireless messages may also be an operator with a corresponding communication unit. The wireless link is established in a conventional standard, for instance by Bluetooth or Wireless Local Area Network (WLAN). The driver, as the operator, can therefore use his smartphone to establish a link to the vehicle and to read information or transfer control commands.

Automatic establishment of the wireless link between the trailer and the towing vehicle is useful because it is time-saving. It is necessary to avoid establishing a wireless link between two vehicles which are not intended to be connected to one another. This is possible, for example, in large depots in which many trailers are close together. A towing vehicle is physically coupled to one of the trailers. The wireless link is intended to be established subsequently or in parallel between the trailer and the towing vehicle, but not between the towing vehicle and a trailer which is only in the vicinity. The situation in which the towing vehicle and the coupled trailer form a wireless network and an adjacent trailer then establishes a wireless link to the network should likewise be avoided.

The automatic establishment of a wireless network between a towing vehicle and a trailer with verification and authorization of the link is known from DE 10 2014 015 394 A1.

Messages made available to a control unit on the CAN bus are likewise available to the other control units in the same vehicle network. The information is also transmitted via the interface according to ISO 11992, that is to say also between the brake control units in the towing vehicle and in the trailer. The interchange of diagnostic messages via the interface is specified in the subordinate standard ISO 11992-4.

Diagnostic messages on the CAN bus are defined in the standards ISO 14229 and ISO 15765, in particular ISO 15765-3. The main purpose is to retrieve states and error codes from control units via diagnostic units connected to an OBD interface. The diagnostic messages are largely standardized but may also have empty fields which can be used by vehicle manufacturers for their own purposes in connection with diagnosis in vehicles. It is also possible to transfer data to control units.

SUMMARY

In an embodiment, the present invention provides a method for establishing a wireless data link between at least two vehicles which are connected to one another via a physical data link. The method includes transmitting link parameters of the wireless link via the physical data link connecting the at least two vehicles and establishing the wireless link using the link parameters transmitted via the physical data link connecting the at least two vehicles.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods for establishing a wireless data link between two vehicles using an existing physical data link. In particular, embodiments of the invention enable establishing the wireless data link to be accomplished in an uncomplicated and automated manner.

According to an embodiment of the invention, link parameters of the wireless link are first of all transmitted via the physical data link. The wireless link is then established using the link parameters. A physical data link is considered to be any type of line which can be used to transmit data. In particular, it is a data link based on international standards. Using the physical data link ensures that precisely the two vehicles which are physically coupled to one another anyway establish a wireless link to one another. As link parameters, unique features of the vehicles involved that are suitable for identification and parameters needed to establish the link can be interchanged, as can further properties such as passwords, encryption algorithms etc.

The wireless data link between two vehicles is considered here to be the simplest form of a cross-vehicle network. The wireless data link can be established automatically, for instance by executing steps in suitable software on the units involved in the data link. The method for establishing the wireless data link preferably takes place automatically without an operator having to intervene. It is only necessary to establish the physical data link beforehand.

According to embodiments of the invention, the wireless data link can be established between a towing vehicle and a trailer. However, it is also possible to use methods according to embodiments of the invention to establish the wireless data link from trailer to trailer.

The physical data link between the two vehicles is advantageously a CAN link according to ISO 11992. This type of link or interface is widespread as a data interface between a towing vehicle and a trailer.

According to a further concept of the invention, the link parameters are transmitted as part of a diagnostic message from Unified Diagnostic Services (UDS) according to ISO 14229 and ISO 15765, in particular ISO 15765-3. The physical data link according to ISO 11992 can therefore be used in the best possible manner for the purposes of the invention. The establishment of a radio link is thereby simplified or is possible in an automated manner, in particular after a trailer has been coupled to a towing vehicle.

According to a further concept of the invention, the wireless data link between the vehicles is a WLAN link, wherein the link parameters for establishing the WLAN link are provided. Wireless links according to IEEE 802.11 (with extensions) are preferably considered to be WLAN links. Important link parameters are the SSID and the password for the case of a secure link.

According to a further concept of the invention, the link parameters contain at least one of the parameters: Service Set Identifier (SSID), password, identification of at least one of the vehicles, network address, Media Access Control (MAC) address. The identifications of electronic control units/communication units involved in setting up the link can also be transmitted as parameters.

According to a further concept of the invention, the method may additionally have the following features:

a) a first communication unit and a first control unit are provided in a first vehicle, and a second communication unit and a second control unit are provided in a second vehicle, b) the two communication units can communicate with one another via the wireless data link, c) the first communication unit and the first control unit can communicate with one another via a data link, d) the second communication unit and the second control unit can communicate with one another via a data link, e) after establishing the physical data link between the first control unit and the second control unit, the first control unit transmits the link parameters for the wireless data link to the second communication unit via the physical data link and the second control unit, f) after receiving the link parameters, the second communication unit establishes the wireless link with the first communication unit.

The first control unit received the link parameters from the first communication unit either in a timely manner or even beforehand. Transmission by the first communication unit is also possible and the first control unit is then only the mediator of the message.

The communication units are likewise control units (for communication) and are referred to here as communication units only for the purpose of better distinction. It is also possible to integrate the communication unit and the control unit in one unit.

According to a further concept of the invention, the first communication unit and the first control unit are connected via a CAN bus. Data are transmitted on the CAN bus, in particular, according to the network protocol SAE J1939. The second communication unit and the second control unit may also be connected via a CAN bus.

According to a further concept of the invention, the second control unit, in particular after receiving the link parameters of the first communication unit, transmits link parameters of the second communication unit to the first communication unit via the physical data link, wherein the two communication units establish a WDS network. WDS (Wireless Distribution System) is understood as meaning a particular method of operation within the WLAN standard according to IEEE 802.11. As a result, both subscribers in the network transmit the same SSID. One subscriber acts as a repeater for the other subscriber. Clients can optionally be connected to the strongest subscriber in each case (here: communication unit).

The invention also relates to a control unit for carrying out the method. This is preferably a brake control unit. The control unit is programmed or provided with software in such a manner that the method takes place automatically. The automatic procedure of the method is preferably initiated by switching on the electrical system in the towing vehicle or by switching on the ignition. The control unit of the first vehicle (the towing vehicle) searches for signals which indicate a physical data link to a second vehicle. As soon as the physical data link has been established between the vehicles, such information is available. The first vehicle can then transmit the link parameters for the wireless link via the physical data link.

The invention also relates to a communication unit for carrying out the method. This is preferably at least one control unit suitable for establishing a WLAN link. There is preferably a link to a further control unit via a CAN bus.

Finally, the invention also relates to a vehicle network for carrying out a method according to the invention, having at least two vehicles which are connected to one another via a physical data link, wherein link parameters for a wireless data link between the vehicles can be transmitted via the physical data link.

Figure 1:
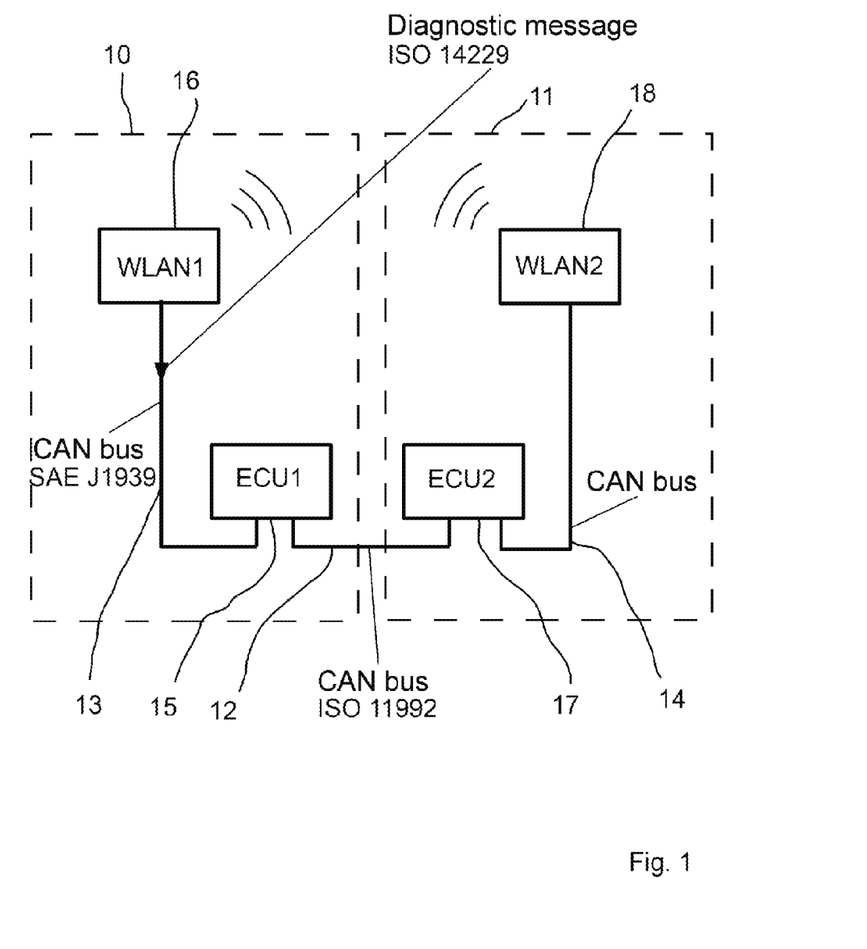
FIG. 1 shows a simplified illustration of control units of two vehicles which are connected to one another via a CAN bus.

According to FIG. 1, a first vehicle 10 and a second vehicle 11 are connected to one another via a physical data link 12 according to ISO 11992. In each vehicle, control units are connected to one another via a CAN bus 13, 14. In the first vehicle 10, a first control unit 15, as a brake control unit, is coupled to a first communication unit 16 via the CAN bus 13. The first control unit 15 is additionally referred to as ECU1 and the first communication unit is referred to as WLAN1 in FIG. 1.

In a similar manner, a second control unit 17 (ECU2) and a second communication unit 18 (WLAN2) are coupled to one another via the CAN bus 14 in the second vehicle 11.

The control units 15 to 18 involved communicate with one another via the CAN buses 13, 14. CAN messages from one of the control units are available to the other control units, depending on the addressing. The use of the known network protocol SAE J1939 is also possible and conventional for CAN messages.

The individual control units can also transmit and read diagnostic messages via the so-called Unified Diagnostic Services (UDS) according to ISO 14229 and ISO 15765-3. In the present case, such diagnostic messages are used to transmit link parameters for establishing a wireless link between the two communication units 16, 18.

In this case, the first vehicle 10 is preferably a towing vehicle and the second vehicle 11 is a trailer. The first control unit 15 is the brake control unit of the towing vehicle, whereas the second control unit 17 is the brake control unit of the trailer. The two brake control units are connected to one another in a known manner via the physical data link 12 and can also interchange diagnostic messages of the UDS via said link according to ISO 11992-4.

In the present example, a wireless data link is provided between the communication units 16, 18 by WLAN. The first communication unit 16 is configured as an access point and transmits its SSID. The same applies to the second communication unit 18 which, as an access point, has its own SSID. The aim is now to establish the WLAN link between the two communication units 16, 18. For this purpose, the first communication unit 16 transmits its own SSID, possibly details for encryption and a password to the second communication unit 18 via the CAN bus 13, the physical data link 12 and the CAN bus 14.

The stated link parameters are packaged in one or more diagnostic messages of the UDS. The second communication unit 18 can connect to the first communication unit 16 by WLAN using the transmitted data. Erroneous links to further vehicles which do not have a physical data link to the first vehicle 10 are ruled out.

Figure 2:
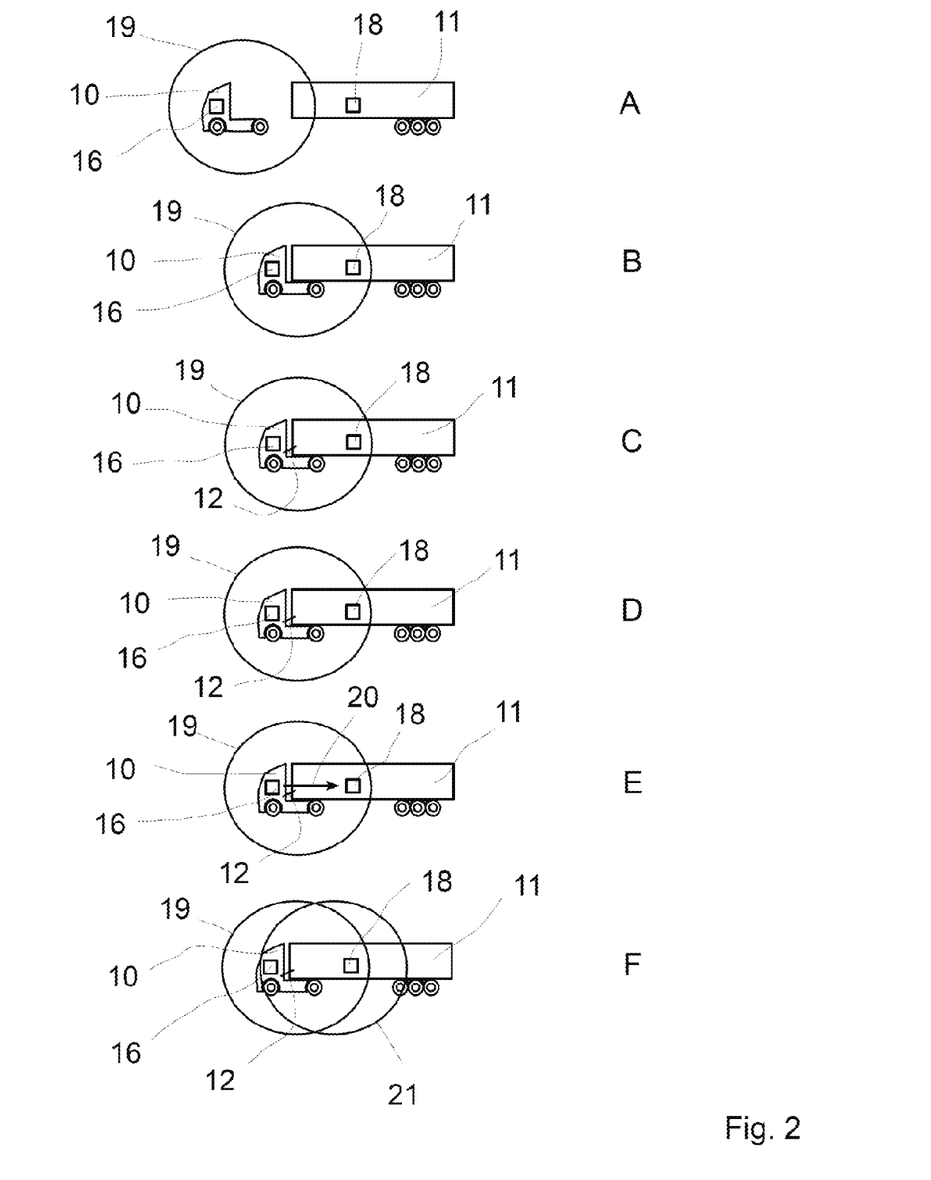
FIG. 2 shows a sequence of the method steps when coupling a trailer to a towing vehicle and when establishing a wireless link.

The sequence when establishing the wireless data link between the two vehicles 10, 11 is explained in connection with FIG. 2. Steps A to F are shown:

A: A towing vehicle as a first vehicle 10 and a trailer as a second vehicle 11 are not yet mechanically coupled. The communication unit 16 in the towing vehicle transmits its SSID by WLAN and is connected to the CAN bus 13 of the towing vehicle. The communication unit 18 in the trailer is likewise connected to the CAN bus 14 of the brake control unit (control unit 17). The WLAN range of the towing vehicle is represented by a circle 19 which does not yet reach the communication unit 18 in the trailer.

B: The trailer is mechanically coupled to the towing vehicle. The second communication unit 18 is now in the range of the WLAN (circle 19) of the towing vehicle.

C: The towing vehicle and the trailer are electrically and pneumatically connected to one another. In this case, the physical data link 12 which connects the brake control units (control units 15 and 17) to one another is also established according to ISO 11992. Said brake control units are not illustrated in FIG. 2 for reasons of space.

D: The brake control unit in the trailer is supplied with power via the link to the towing vehicle and registers on the CAN bus 13 as a control unit. The brake control unit in the towing vehicle detects, on the basis of the messages on the CAN bus, that a trailer having a control unit has been coupled and forwards this information to the communication unit 16. Alternatively, the communication unit 16 (which is itself also a control unit) independently detects, on the basis of the messages present on the CAN bus 13, that a trailer having a control unit has been coupled. The communication unit 16 in the towing vehicle then, or after the expiry of a defined period, generates one or more diagnostic messages 20 containing information for the wireless link, in particular its own SSID and the password for the WLAN of the towing vehicle.

E: The generated diagnostic messages 20 are now present on the CAN bus 13 of the towing vehicle and are forwarded from the brake control unit to the brake control unit of the trailer via the physical data link 12. From there, the diagnostic messages 20 and the information contained therein pass to the communication unit 18 of the trailer.

F: After receiving the information contained in the diagnostic messages 20, the communication unit 18 of the trailer connects to the communication unit 16 of the towing vehicle. In this case, the communication unit 18 establishes a WLAN 21 which also reaches the communication unit 16.

As a result, the communication unit 18 (trailer) is the client in the WLAN of the communication unit 16 (towing vehicle). Alternatively, the two communication units 16, 18 can also span a common network by WDS in order to thus increase the range of one of the two WLANs 19, 20 or to establish a common network, with the result that all information available in one of the two WLANs 19, 20 can be retrieved by a client outside the two networks.

Figure 3:
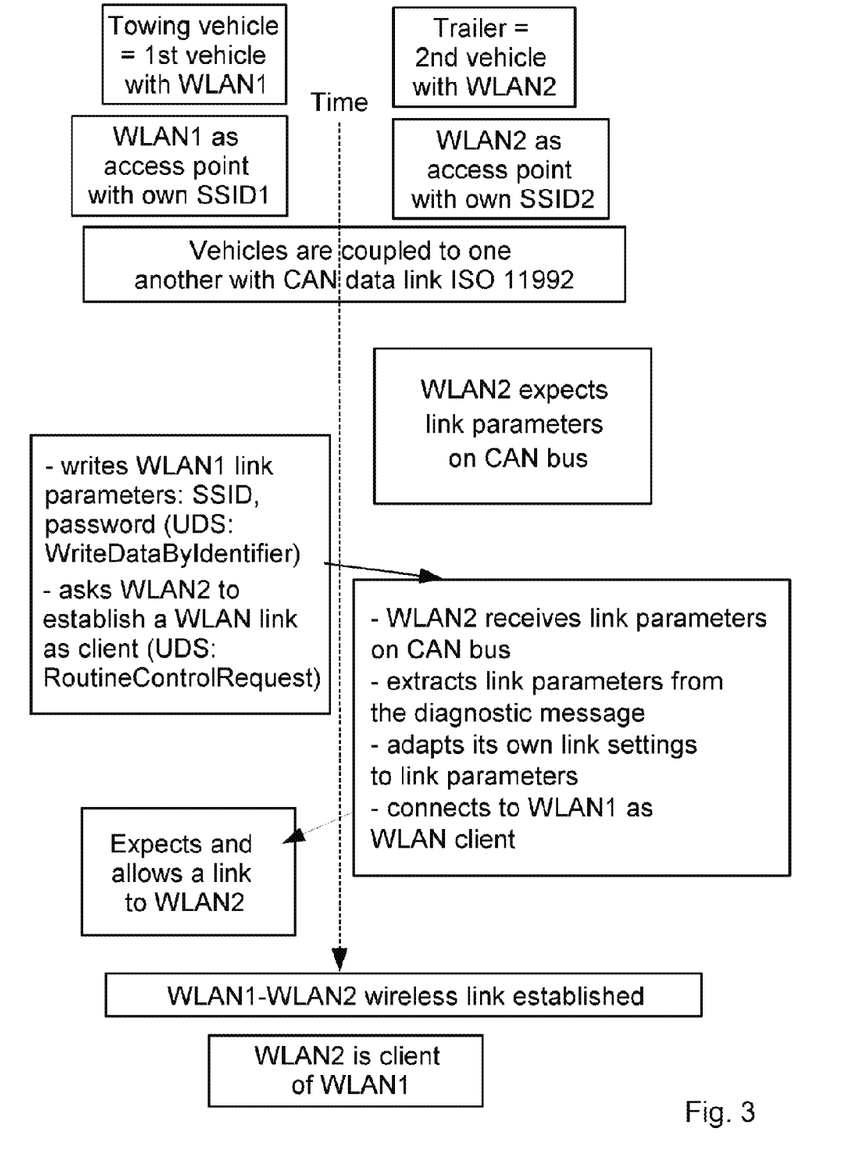
FIG. 3 shows another illustration of the sequence of the method steps with a link between a client and an access point.

The individual steps when establishing the client access point link are illustrated in FIG. 3. It is necessary to transfer the link parameters from the first communication unit 16 (WLAN1) of the towing vehicle to the second communication unit 18 (WLAN2) in the trailer. For this purpose, the link parameters, in particular the SSID and password, are packaged in a UDS diagnostic message, specifically as a WriteDataByIdentifier, and are transmitted via the CAN bus. The first communication unit (WLAN1) additionally requests the establishment of a WLAN link, in which case the second communication unit (WLAN2) is intended to be the client. The corresponding UDS diagnostic message is referred to as the RoutineControlRequest. The second communication unit 18 (WLAN2) reads the diagnostic messages, extracts the link parameters, adapts its own link settings and connects to the first communication unit 16 (WLAN1) as a WLAN client. The wireless link exists between WLAN1 as an access point and WLAN2 as a client.

Figure 4:
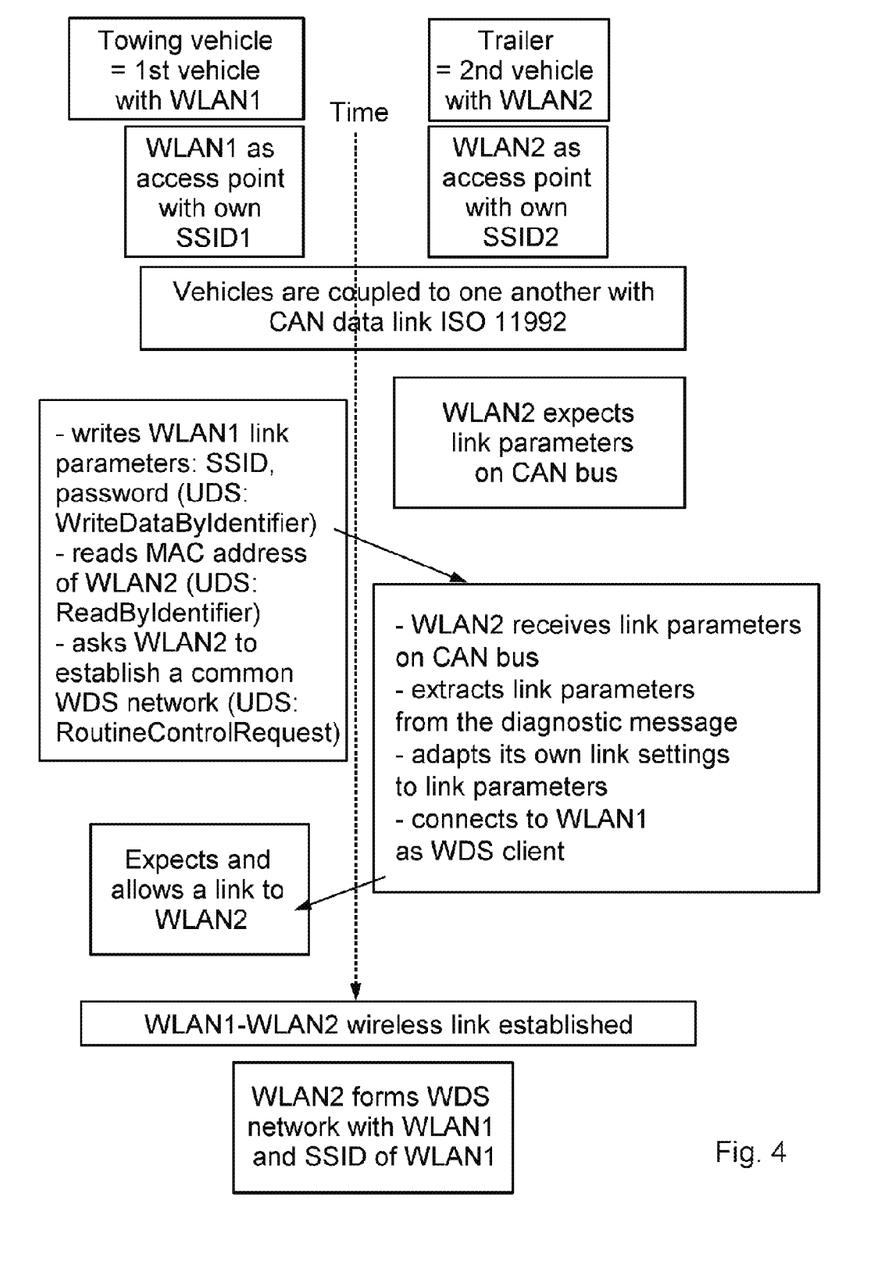
FIG. 4 shows a sequence of the method steps according to FIG. 3, but with the result of two access points in a WDS network.

The establishment of the WDS network emerges from FIG. 4 and the details contained therein. It is again necessary to transfer the link parameters from the first communication unit 16 (WLAN1) of the towing vehicle to the second communication unit 18 (WLAN2) in the trailer. For this purpose, the link parameters, in particular the SSID and password, are transmitted as a WriteDataByIdentifier via the CAN bus. In addition, WLAN1 reads the MAC address of WLAN2. The associated UDS message is referred to as the ReadByIdentifier. In addition, the first communication unit (WLAN1) requests the establishment of a common WDS network. The corresponding UDS diagnostic message is again referred to as the RoutineControlRequest. The second communication unit 18 (WLAN2) reads the diagnostic messages, extracts the link parameters, adapts its own link settings and connects to the first communication unit 16 (WLAN1) as a WDS client. WLAN1 then accepts the link to WLAN2 to form a WDS network.

Various standards (ISO, IEEE, SAE) are mentioned in the preceding text, in the claims and in the figures. Unless stated otherwise, the versions valid on the priority date of this application are meant, or the following versions:

ISO 11992→ISO 11992-1: Interchange of digital information on electrical connections between towing and towed vehicles, Part 1: Physical and Data Link Layer, 2001-11-20.

ISO 11992-4: Interchange of digital information on electrical connections between towing and towed vehicles, Part 4: Diagnostics, 2003-01-27.

ISO 14229 UDS, Part 1: Specification and requirements, 2004-10-07.

ISO 15765 Diagnostics on CAN, Part 1: General information, 2003-04-20.

ISO 15765-3 Diagnostics on CAN, Part 3: Implementation of diagnostic services, 2003-05-12.

SAE J1939-11 Physical layer 250K bits twisted shielded pair, 09/2006.

IEEE 802.11→IEEE 802 Part 11: Wireless LAN Medium Access Control (MAC) and Physical Layer (PHY) Specifications, 2012-03-29.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a wireless data link between at least two vehicles which are connected to one another via a physical data link, wherein a first of the at least two vehicles is a towing vehicle comprising a first wireless communication unit and a second of the at least two vehicles is a trailer comprising a second wireless communication unit, the method comprising:

transmitting, from the towing vehicle to the trailer, at least one of a plurality of link parameters of the wireless data link via the physical data link connecting the at least two vehicles, wherein the plurality of link parameters include a service set identifier (SSID), a password, an identification of the towing vehicle, and a network address and wherein the physical data link connecting the at least two vehicles is a Controller Area Network (CAN) link according to International Organization for Standardization (ISO) 11992 or to ISO 11992 with ISO 11992-1: Interchange of digital information on electrical connections between towing and towed vehicles, Part 1: Physical and Data Link Layer, 2001-11-20, and;

receiving from the trailer, via the physical data link, the Media Access Control (MAC) address of the second wireless communication unit;

establishing the wireless link using the at least one link parameter transmitted via the physical data link connecting the at least two vehicles, wherein the at least one link parameter is transmitted as part of a first diagnostic message from Unified Diagnostic Services (UDS) and the MAC address is transmitted as part of a second diagnostic message from UDS, and wherein the first and second diagnostic messages from UDS are configured according to according to ISO 14229 and ISO 15765 or to ISO 14229 UDS, Part 1: Specification and requirements, 2004-10-7, and ISO 15765 Diagnostics on CAN, Part 1: General information, 2003-04-20.

2. The method as claimed in claim 1, wherein the wireless data link between the vehicles is a Wireless Local Area Network (WLAN) link, and wherein the link parameters for establishing the WLAN link are provided.

3. The method as claimed in claim 1, wherein:
a) a first control unit is provided in the towing vehicle, and a second control unit is provided in the trailer,
b) the first and second wireless communication units are configured to communicate with one another via the wireless data link,
c) the first wireless communication unit and the first control unit are configured to communicate with one another via a first data link,
d) the second wireless communication unit and the second control unit are configured to communicate with one another via a second data link,
e) the first control unit transmits the at least one link parameter for the wireless data link to the second wireless communication unit via the physical data link and the second control unit, and
f) after receiving the at least one link parameter, the second wireless communication unit establishes the wireless link with the first wireless communication unit.

4. The method as claimed in claim 3, wherein the first wireless communication unit and the first control unit are connected via a CAN bus and data are transmitted.

5. The method as claimed in claim 3, wherein the second wireless communication unit and the second control unit are connected via a CAN bus.

6. The method as claimed in claim 3, wherein the second control unit transmits at least one link parameter of the second wireless communication unit to the first wireless communication unit via the physical data link, and wherein the first and second wireless communication units establish a Wireless Distribution System (WDS) network.

7. A control unit configured to carry out the method as claimed in claim 1.

8. A communication unit configured to carry out the method as claimed in claim 1.

9. A vehicle network configured to carry out the method as claimed in claim 1, the vehicle network including the at least two vehicles which are connected to one another via a physical data link.

\* \* \* \* \*